United States Patent
Agneray et al.

(10) Patent No.: US 7,974,068 B2
(45) Date of Patent: Jul. 5, 2011

(54) PSEUDOPERIODIC LOGIC SIGNAL GENERATOR

(75) Inventors: Andre Agneray, Boulogne (FR); Franck Deloraine, Fontenay Aux Roses (FR); Julien Couillaud, Athis-Mons (FR)

(73) Assignee: Renault S.A.S., Boulogne Billancourt (FR)

( * ) Notice: Subject to any disclaimer, the term of this patent is extended or adjusted under 35 U.S.C. 154(b) by 175 days.

(21) Appl. No.: 12/439,174

(22) PCT Filed: Jul. 27, 2007

(86) PCT No.: PCT/FR2007/051737
§ 371 (c)(1),
(2), (4) Date: Apr. 7, 2009

(87) PCT Pub. No.: WO2008/025911
PCT Pub. Date: Mar. 6, 2008

(65) Prior Publication Data
US 2009/0323249 A1    Dec. 31, 2009

(30) Foreign Application Priority Data
Aug. 30, 2006    (FR) ...................................... 06 07639

(51) Int. Cl.
*F23Q 3/00* (2006.01)

(52) U.S. Cl. ........................................ 361/263; 361/253
(58) Field of Classification Search .................. 361/253, 361/257, 262, 263
See application file for complete search history.

(56) References Cited

U.S. PATENT DOCUMENTS

| 4,399,802 A | * | 8/1983 | Oshiage et al. .......... 123/406.24 |
| 5,812,831 A | | 9/1998 | Crocker |
| 5,828,588 A | | 10/1998 | Grant |
| 5,954,772 A | * | 9/1999 | Akiyama et al. ................ 701/29 |

FOREIGN PATENT DOCUMENTS

| EP | 1 515 408 | 3/2005 |
| WO | 9720268 | 6/1997 |

* cited by examiner

*Primary Examiner* — Danny Nguyen
(74) *Attorney, Agent, or Firm* — Oblon, Spivak, McClelland, Maier & Neustadt, L.L.P.

(57) ABSTRACT

A generator of a pseudoperiodic logic signal of mean period $T_{mean}$ includes: a reference clock of period $T_{ref}$, a logic memory, changing state on receipt of a pulse, a first mechanism producing a normal pulse on completion of a base time interval $T_{sec}=K \times T_{ref}$ with K an integer, a second mechanism producing a shifted pulse on completion of a modified time interval $T'_{sec}=(K \pm 1) \times T_{ref}$, and a selector capable of selecting the mechanism that produces the pulse, in such a way as to regularly include a shifted pulse so as to correct the mean period, to generate a pseudoperiodic signal. Such a generator may find application, as an example, to driving a resonator for producing a plasma spark for radiofrequency ignition.

12 Claims, 3 Drawing Sheets

PSEUDOPERIODIC LOGIC SIGNAL GENERATOR

Figure 1:
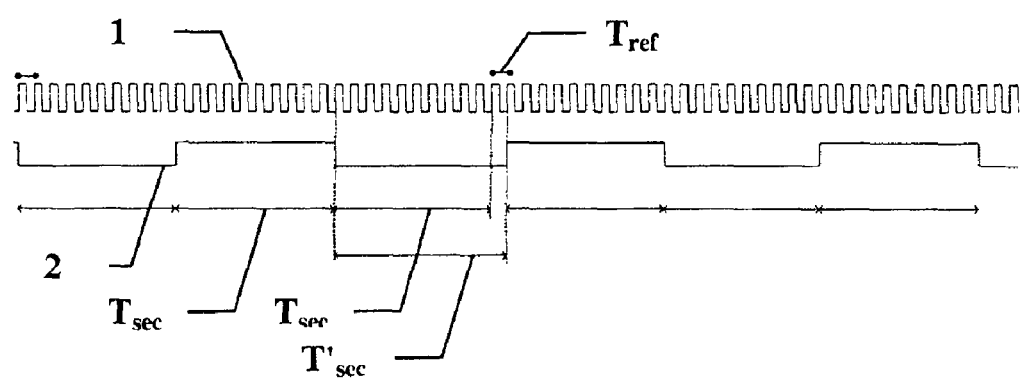

The present invention relates to a pseudoperiodic logic signal generator that can be used in many applications and particularly in a motor vehicle plasma ignition application by radiofrequency driving of a resonator of a multi spark plug.

In the field of modern motor vehicle ignitions the multi spark plug MSP exhibits a substantial innovation and geometry different to conventional spark plugs. Such an MSP is described in detail in FR 03-10766, FR 03-10767, FR 03-10768, FR 04-12153 and FR 05-00777.

AN MSP comprises a resonator the resonant frequency $F_c$ of which lies in the high frequencies, typically between 4 and 6 MHz. The control of such an MSP requires a periodic control signal of frequency $F_p$ that is as close as possible to the frequency $F_c$. The patent application FR 05-12769 in the name of the applicant describes the practical details and the constraints for optimum frequency control of a radiofrequency ignition of this type. The Q-factor Q of an MSP and its associated resonator is high, Q=90-100. It follows from this that the bandwidth $\Delta\omega$, which is inversely proportional to the Q-factor according to the relation $\Delta\omega=1/Q$, is relatively narrow. The control of the MSP consequently requires a control frequency $F_p$ equal to the resonant frequency $F_c$ with a precision better than 10 kHz, or ±0.2% for the frequencies considered.

In order to produce a periodic control signal with precision such as this it is known to use an analogue solution comprising a Voltage Controlled Oscillator (VCO). Such a solution has the following drawbacks: high sensitivity to interference, difficult parameterization of the frequency and general complexity.

It is also known to use a digital solution by integer division of a reference clock. Taking account of the precision of the expected frequency, such a solution requires a clock rate of the device at a reference frequency greater than 2.5 GHz. The cost of a processor of this type prohibits its use in the motor vehicle sector.

The present invention eliminates these various drawbacks by proposing a pseudoperiodic logic signal generator based on a clock operating at a reference frequency $F_{ref}$ equal to several hundreds of MHz at maximum. Such a generator produces a periodic signal of frequency $F_{fix}$ obtained by integer division of the reference frequency regularly modified by a correction C applied to one of its cycles so as to produce a pseudoperiodic signal of mean frequency $F_{mean}=F_{fix}\pm C$.

The subject of the invention is a pseudoperiodic logic signal generator comprising a reference clock capable of producing a reference signal of period $T_{ref}$, a logic memory means providing as output a stored logic state and controllable to change state on receiving a pulse, a first production means capable of producing a nominal pulse at the end of a basic time interval $T_{sec}=K \times T_{ref}$, with K an integer, a second production means capable of producing an offset pulse at the end of a modified time interval $T'_{sec}=(K\pm1)\times T_{ref}$, a selector means capable of selecting, between the first production means and the second production means, the means that produces the pulse controlling said logic memory means in such a way as to include an offset pulse for correcting the mean period so as to generate a pseudoperiodic signal of mean period $$T_{mean} = 2\frac{\sum_N T_{sec}}{N} = 2(K \pm L) \times T_{ref},$$

with K an integer and L a real correction factor between 0 and 1.

An advantage of the device according to the invention is to enable control of the resonator of an MSP with the mean frequency precision close to the frequency expected with a clock of relatively low reference frequency.

Another advantage of the device according to the invention is to enable simple determination of K and L which are functions of the integer part and of the fractional part of the ratio $$\frac{T_{mean}}{2T_{ref}}$$

respectively.

According to another feature of the invention, the generator further comprises a third production means capable of producing an advanced pulse at the end of a shortened time interval $$T''_{sec} \le \left(\frac{K}{2}\right) \times T_{ref},$$

the selector means being capable of selecting the third production means so that the first M pulses are advanced pulses.

Another advantage of the device according to the invention is thus to avoid the appearance of an overvoltage at the terminals of the controlled transistor at the start of the production of a pseudoperiodic signal train.

Another advantage of the device is to limit switching losses at the transistor terminals, as the voltage and the current at the transistor terminals are out of phase by $\pi$ at the resonant frequency.

The invention also relates to a radiofrequency ignition circuit comprising such a generator frequency-controlling a resonator circuit for the production of a plasma.

Figure 2:
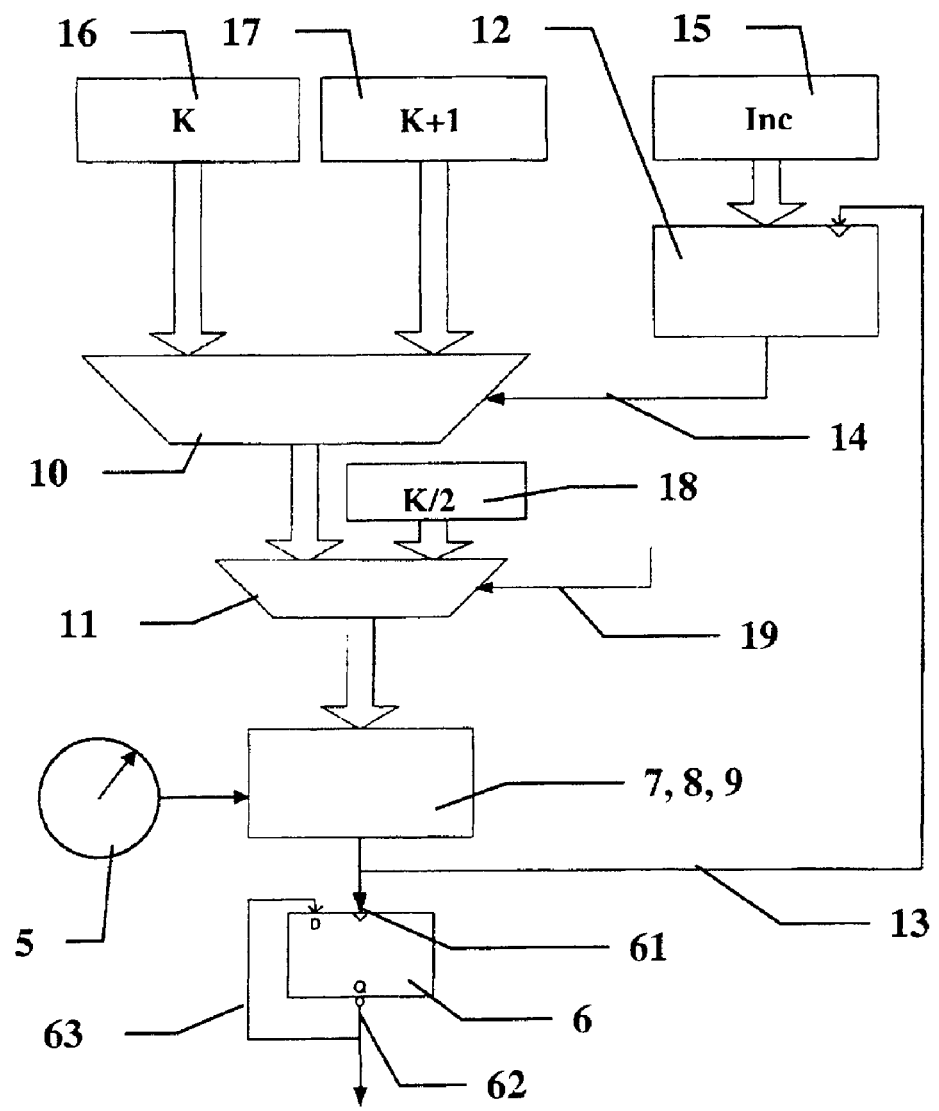
Figure 3:
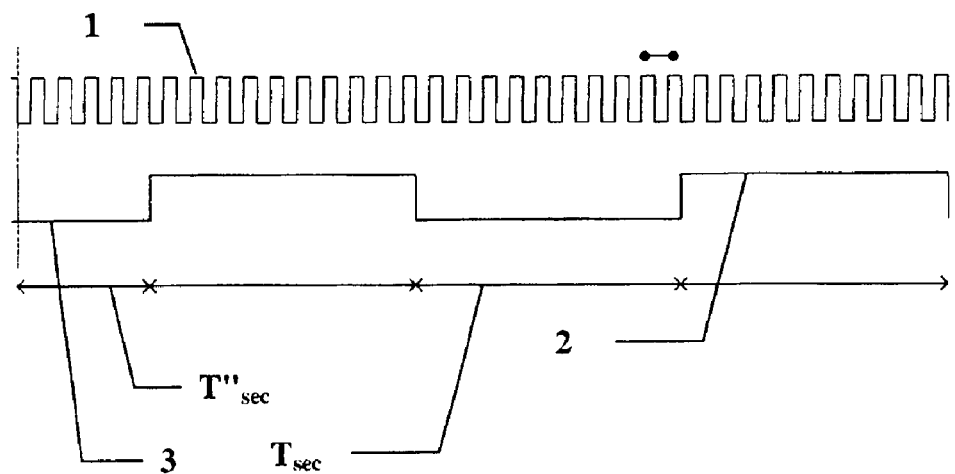

Further features, details and advantages of the invention will emerge more clearly from the detailed description below, provided by way of indication in relation to the drawings, in which:

FIG. 1 shows a comparative time-chart of a periodic reference signal and a pseudoperiodic signal such as produced by a generator according to the invention;

FIG. 2 presents an embodiment of a generator according to the invention;

FIG. 3 shows a time chart of the start of the pseudoperiodic signal; and

Figure 4:
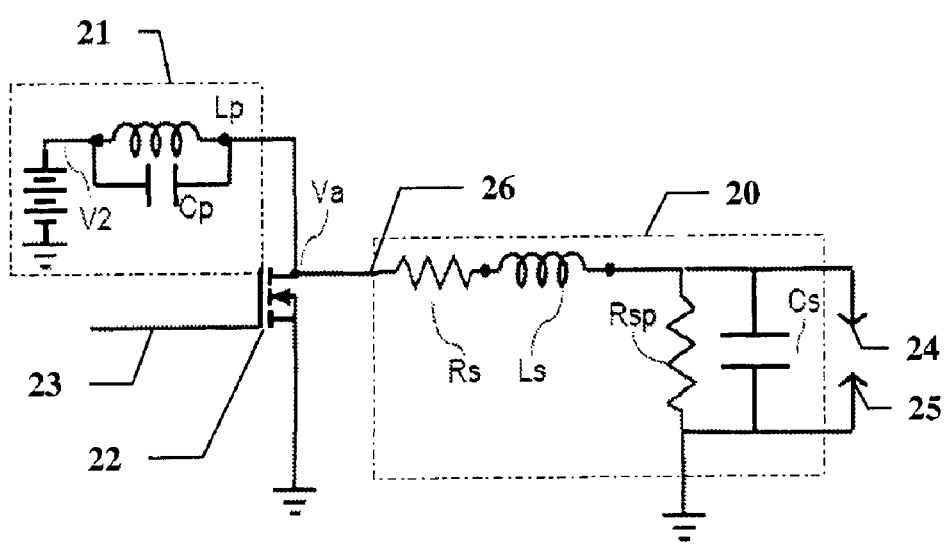

FIG. 4 schematically illustrates a radiofrequency ignition.

FIG. 1 shows, on a diagram as a function of compared time, a periodic reference signal 1 of period $T_{ref}$ and a signal indicative of a pseudoperiodic signal 2 produced by the generator according to the invention, It is assumed in the entire description by way of example of a digital application that the reference clock has a period $T_{ref}=8$ ns ($F_{ref}=125$ MHz) and that it is desired to produce a target signal of mean frequency $T_{mean}=170$ ns. By integer division of the reference clock it is only possible to obtain periods that are a multiple of the reference period $T_{ref}$, or 160 ns (×10) or 176 ns (×11).

The principle of the invention consists in producing signal periods of a length that is a multiple of the reference period and correcting the mean period of the signal by regularly modifying the length of a correction period. Said modification may consist in lengthening, or curtailing respectively, said correction period by adding, or shrinking respectively, a reference period $T_{ref}$. With reference to FIG. 1, the signal 2 comprises half-cycles of length $T_{sec}=K \times T_{ref}$, here with K=10. Depending on the correction factor L, a half-cycle $T_{sec}$ is regularly replaced by a correction half-cycle, here lengthened, of length $T'_{sec}=(K+1) \times T_{ref}$. Alternatively, this correction period might be shortened by the length $T'_{sec}=(K-1) \times T_{ref}$.

To return to the example of a digital application, by using a lengthened period the parameters K=10 and L=0.625 enable a mean period of $T_{mean}$=170 ns to be obtained. Likewise, by using a shortened period the parameters K=11 and L=0.375 enable the same mean period to be obtained.

In order to produce such a signal, the generator, one embodiment of which is shown diagrammatically in FIG. 2, comprises a reference clock 5 capable of delivering a reference signal 1 of period $T_{ref}$. A logic memory means 6 is used to shape the signal 2 produced. This memory means 6 supplies at output 62 a maintained logic state (0 or 1). This memory means 6 can be controlled by an input 61 in that the output state 62 changes when, and each time, the memory means 6 receives a pulse at its input 61. In the remainder of the application a pulse will be understood as a pulse signal or a signal indicating a change in state, for example a leading edge. Such a pulse, whatever its format, is defined jointly by the receiver memory means 6 and the transmitter pulse-production means. The generator also comprises a first production means 7 capable of producing, from said reference signal 1, a nominal pulse at the end of a basic time interval $T_{sec}=K \times T_{ref}$ with K an integer, a second production means 8 capable of producing, from said reference signal 1, an offset pulse at the end of a modified time interval $T'_{sec}=(K \pm 1) \times T_{ref}$.

It will be observed that if $T_{ref}$ is the period of the reference signal, $T_{sec}$ and $T'_{sec}$ (and $T''_{sec}$ which will be described below) are homogeneous times with half-cycles of the pseudoperiodic signal 2. The pseudoperiodic signal 2 is constructed half-cycle by half-cycle.

The generator also comprises a selector means 10, 12 capable of selecting, between the first production means 7 and the second production means 8, the production means that produces the pulse controlling said logic memory means 6. Said selector 10, 12 is responsible for the transmission, in sequence, of nominal pulses produced by the first production means 7 and for including in said sequence a regularly offset pulse positioned so as to correct the mean period. The logic memory means 6 thus receives a sequence of nominal pulses followed by an offset pulse. This enables generation of a pseudoperiodic signal 2 comprising, repetitively, sequences composed of half-cycles of length $T_{sec}$ and of a modified period of length $T'_{sec}$. The pseudoperiodic signal 2 thus generated has a mean period $T_{mean}$ that can be calculated by a mean over at least N half-cycles, or $$T_{mean} = 2 \frac{\sum_N T_{sec}}{N} = 2(K \pm L) \times T_{ref},$$

with K an integer and L a real correction factor between 0 and 1.

With $F_{mean}$ as the mean frequency of the pseudoperiodic signal 2, the following relation is obtained:

$$\frac{T_{mean}}{2T_{ref}} = \frac{F_{ref}}{2F_{mean}} = K \pm L.$$

By identification it is possible to deduce from this simple relations between the generator configuration parameters K and L and the integer part $$E = \text{Int}\left(\frac{T_{mean}}{2T_{ref}}\right) = \text{Int}\left(\frac{F_{ref}}{2F_{mean}}\right)$$

and the fractional part $$E = \text{Frac}\left(\frac{T_{mean}}{2T_{ref}}\right) = \text{Frac}\left(\frac{F_{ref}}{2F_{mean}}\right)$$

of half the ratio of the periods or of half the ratio of the frequencies. It is necessary to distinguish the case in which the time interval is increased and that in which it is curtailed. In the case in which the time interval is increased, $T'_{sec}=(K+1) \times T_{ref}$, K=E and L=F are obtained. In the case in which the time interval is curtailed, $T'_{sec}=(K-1) \times T_{ref}$, K=E+1 and L=1-F are obtained.

Taking account of the frequencies chosen for the reference clock, voluntarily limited to several hundreds of MHz, and of the target mean frequencies desired for the pseudoperiodic signal of between 4.17 MHz and 6.25 MHz, the integer K is advantageously between 10 and 15.

The pseudoperiodic signal 2 is advantageously used to control an MSP. FIG. 4 shows the electronic circuit for such a spark plug. This circuit comprises a sub-circuit 20 acting as a resonator, constructed around an RLC series comprising a resistor Rs, an inductor Ls and a capacitor Cs. When it is excited at its input 26 by a frequency signal $F_p$ close to its eigenfrequency $F_e$, this resonator 20 produces a spark between the electrodes 24, 25 of the spark plug. Another sub-circuit 21 comprising a parallel LC consists of an inductor Lp in parallel with a capacitor Cp. This circuit converts a voltage V2 into an amplified voltage Va which is provided at the terminal of an MOS transistor 22 connected to the input 26 of the resonator 20. The pseudoperiodic signal 2 is injected to the gate 23 of the transistor 22. Said transistor 22 acts like a switch and transmits (or blocks respectively) the voltage Va at the input 26 when the signal 2 is in the high (or low respectively) logic state.

The multi spark plug produces a spark between its electrodes 24, 25 when its resonator 20 is excited by the pseudoperiodic signal 2. In order to control the production of the spark, the signal 2 is not permanent but is present in the form of trains. At the start of the train, the start of driving the resonator 20, produces a transient regime that causes an overvoltage at the transistor terminals 22. This overvoltage may become greater than the rated voltage of the permanent regime and is harmful in that it requires oversizing of electrical components. One means of eliminating or at least reducing this overvoltage consists in reducing the duration of the first half-cycle(s) of the signal 2.

To do that, the generator advantageously comprises a third production means 9 capable of producing, from said reference signal 1, an advanced pulse at the end of a shortened time interval $$T''_{sec} \le \left(\frac{K}{2}\right) \times T_{ref}$$

so as to enable the production of a time interval at least twice as short as the basic time interval defining a nominal half-cycle. The factor K/2 is advantageously an integer. The division operator is here advantageously a Euclidean divider. The selector means 10, 11, 12 is designed to be able to select said third production means 9 so that the first M pulses controlling said logic memory means 6 are advanced pulses. M is between 1 and the total number of half-cycles of a train. Thus, for the first M half-cycles of a train the logic memory means 6 produces shortened half-cycles.

In order to reduce the cost of components, the period $T_{ref}$ of the reference clock is advantageously between 1 ns and 200 ns, or a clock-rate frequency of between 5 MHz and 1 GHz. According to a preferable embodiment, the period $T_{ref}$ of the reference clock is equal to 8 ns, corresponding to a frequency of 125 MHz.

Advantageously, the logic memory means 6 comprises an inverse logic trigger DQ 6, preferably self-sustained by means of a loop 63.

According to one embodiment, a production means 7, 8, 9 comprises a counter 7, 8, 9 which can be parameterized and is able to count an integer number P of reference periods $T_{ref}$ and to generate a pulse at the end of the counting. Said counter is interfaced to the reference clock 5 and receives a counting parameter P.

The first production means 7 is parameterized with P=K in order to produce nominal half-cycles. The second production means 8 is parameterized with P=K+1 or P=K−1 respectively in order to produce lengthened or curtailed half-cycles respectively. The third production means 9 is parameterized with P=K/2, or any lower integer, in order to produce shortened half-cycles at the start of each train.

Advantageously, the first production means 7, the second production means 8 and the third production means 9 are combined in a single production means 7, 8, 9 alternately parameterized with P=K, P=K+1 and P=K/2. The choice of parameterization may be carried out by the selector means 10, 11, 12.

According to an advantageous feature of the invention, the selector 10, 11, 12 comprises an accumulator 12, which is incremented for each pulse produced by a production means 7, 8, 9 by an increment Inc determined depending on the desired frequency correction, and a multiplexer 10, 11 that can be selected between the parameters K, K±1 and K/2. The accumulator 12 is informed of the production of a pulse by one of the production means 7, 8, 9 via the branch 13. The multiplexer may be single or staged in two components 10, 11, as shown in FIG. 2. The selection is made, via the branch 19, for the parameter K/2 at the start of the train for the first M pulses of the train. Then, in the stable state, the selection is made between K and K±1. By default, the selector 10 transmits the parameter K to the production means 7, 8, 9 in order to produce nominal pulses. When it reaches saturation, the accumulator 12 selects, via the branch 14, the parameter K±1 in order to produce a modified pulse.

The function of the accumulator 12 is to determine when an offset pulse should be inserted between the basic pulses. To do this, the accumulator 12 comprises an n-bit memory register and can therefore take $2^n$ values. In order to take account of the frequency correction necessary to obtain the desired mean frequency $F_{mean}$, the increment Inc is then equal to Inc=Rounded($2^n$L). This then gives $$Inc = \text{Rounded}\left(2^n \text{Frac}\left(\frac{T_{mean}}{2T_{ref}}\right)\right)$$

when the pulse is delayed (namely when the time interval is increased) or $$Inc = \text{Rounded}\left(2^n\left(1 - \text{Frac}\left(\frac{T_{mean}}{2T_{ref}}\right)\right)\right)$$

when the pulse is advanced (namely when the time interval is curtailed). The Rounded function here denotes the nearest integer. The register is incremented each time a pulse is produced. Saturation is reached when said register reaches or exceeds the value $2^n$; the parameter K±1 is then selected for a pulse, via the branch 14. The register, being cyclic, is advantageously permanently available to be incremented. It is notable that in this embodiment a mean frequency $F_{mean}$ of the signal is obtained without direct counting of the half-cycles. This frequency is thus very close to the target frequency, to within the rounding carried out. The precision thus obtained increases with the dimension n of the register of the accumulator 12.

An 8-bit memory register for the accumulator 12 meets the precision requirement of the application.

Returning to the example of a digital application, in order to obtain a mean period $T_{mean}$=170 ns with a reference period $T_{ref}$=8 ns, for an accumulator 12 equipped with an 8-bit register, an increment Inc should be used equal to $$\text{Rounded}\left(2^8 \text{Frac}\left(\frac{170}{2 \times 8}\right)\right) = \text{Rounded}(256 \times 0.625) = 160 = Inc$$

if the correction half-cycle is lengthened, this case corresponding to K=10, and equal to $$\text{Rounded}\left(2^8\left(1 - \text{Frac}\left(\frac{170}{2 \times 8}\right)\right)\right) = \text{Rounded}(256 \times 0.375) = 96 = Inc$$

if the correction half-cycle is curtailed, this case corresponding to K=11.

According to one embodiment, the generator comprises storage registers 16, 17, 18, 15 with parameters K, K±1, K/2 and with the increment Inc allowing the mean frequency $F_{mean}$ to be set. Taking account of the envisaged values, these registers are advantageously 4-bit registers 16, 17, 18 for K, K±1, and K/2 and an 8-bit register 15 for the increment Inc.

In order to determine trains of the pseudoperiodic signal 2, the generator also comprises an adjustable timer means (not shown) capable of limiting the duration of generation of said pseudoperiodic logic signal 2.

In order to control an MSP correctly, said duration is advantageously adjustable between 50 µs and 500 µs.

The preceding functional description of the generator according to the invention does not presuppose the technology used. It would be manifest to the person skilled in the art that the principles described may be implemented according to several embodiments.

The generator may be produced with discrete logic components such as logic gates, counters, accumulators, etc.

The generator may also be produced with a dedicated logic component of the Application Specific Integrated Circuit or ASIC type.

The generator may also be produced with at least one programmable component of the File Programmable Gate Array or FPGA type, a microcontroller or a microprocessor.

The invention claimed is:

1. A pseudoperiodic logic signal generator of mean period $T_{mean}$ comprising:
   a reference clock configured to produce a reference signal of period $T_{ref}$;
   logic memory means providing as an output a stored logic state and controllable to change state on receiving a pulse;
   first production means configured to produce, from the reference signal, a nominal pulse at an end of a basic time interval $T_{sec}=KXT_{ref}$ with K an integer;
   second production means configured to produce, from the reference signal, an offset pulse at an end of a modified time interval $T'_{sec}=(K\pm1)XT_{ref}$, and
   selector means capable for selecting, between the first production means and the second production means, the means that produces the pulse controlling the logic memory means, in such a way as regularly to include an offset pulse for correcting the mean period so $$T_{mean} = 2\frac{\sum_N T_{sec}}{N} = 2(K \pm L) \times T_{ref},$$

as to generate a pseudoperiodic signal of mean period with K an integer and L a real correction factor between 0 and 1.

2. The generator as claimed in claim 1, further comprising third production means configured to produce, from the reference signal, an advanced pulse at an end of a shortened time interval $$T''_{sec} \leq \left(\frac{K}{2}\right) \times T_{ref},$$

the selector means being configured to select the third production means so that the first M pulses controlling the logic memory means are advanced pulses.

3. The generator as claimed in claim 1, in which the period $T_{ref}$ of the reference clock is between 1 ns and 200 ns.

4. The generator as claimed in claim 1, in which the logic memory means comprises a self-sustained inverse logic trigger.

5. The generator as claimed in claim 2, in which at least one of the production means comprises a counter that can be parameterized and is configured to count an integer number P of reference periods $T_{ref}$ and to generate a pulse at the end of the counting.

6. The generator as claimed in claim 5, in which the first production means is parameterized with P=K, the second production means is parameterized with P=K±1, and the third production means is parameterized with P=K/2.

7. The generator as claimed in claim 6, in which the first production means, the second production means, and the third production means are combined in a single production means alternately parameterized with P=K, P=K+1 and P=K/2.

8. The generator as claimed in claim 1, in which the selector means comprises:
   an accumulator, which is incremented for each pulse produced by at least one of the production means by an increment Inc determined depending on a desired frequency correction; and
   a multiplexer that can be selected between the parameters K, K±1 and K/2 so as to parameterize a production means such that:
   the parameter K/2 is selected for the first M pulses;
   the parameter K is then selected by default;
   the parameter K±1 is selected when the accumulator reaches saturation.

9. The generator as claimed in claim 8, in which the accumulator comprises an n-bit memory register and in which the increment Inc is equal to $$Inc = \text{Rounded}\left(2^n \text{Frac}\left(\frac{T_{mean}}{2T_{ref}}\right)\right)$$

when the pulse is delayed and to $$Inc = \text{Rounded}\left(2^n \left(1 - \text{Frac}\left(\frac{T_{mean}}{2T_{ref}}\right)\right)\right)$$

when the pulse is advanced.

10. The generator as claimed in claim 8, further comprising 4-bit storage registers that store the parameters K, K±1 and K/2 and an 8-bit storage register for storing the increment Inc.

11. The generator as claimed in claim 1, further comprising an adjustable timer means so as to limit duration of generation of the pseudoperiodic logic signal.

12. A radiofrequency ignition circuit, comprising:
   a generator;
   a transistor; and
   a resonator circuit,
   the generator controlling the power switching to the resonator circuit via the transistor according to a pseudoperiodic logic signal so as to frequency-control the resonator circuit to produce a plasma spark,
   wherein said generator comprises:
   a reference clock configured to produce a reference signal of period $T_{ref}$;
   logic memory means providing as an output a stored logic state and controllable to change state on receiving a pulse;
   first production means configured to produce, from the reference signal, a nominal pulse at an end of a basic time interval $T_{sec}=KXT_{ref}$ with K an integer;
   second production means configured to produce, from the reference signal, an offset pulse at an end of a modified time interval $T'_{sec}=(K\pm1)XT_{ref}$, and
   selector means capable for selecting, between the first production means and the second production means, the means that produces the pulse controlling the logic memory means, in such a way as regularly to include an offset pulse for correcting the mean period so as to generate a pseudoperiodic signal of mean period $$T_{mean} = 2\frac{\sum_N T_{sec}}{N} = 2(K \pm L) \times T_{ref},$$

with K an integer and L a real correction factor between 0 and 1.

* * * * *